United States Patent [19]

Drostholm

[11] 3,943,224

[45] Mar. 9, 1976

[54] METHOD AND APPARATUS FOR MAKING CONTINUOUS LENGTHS OF RESIN TUBES

[76] Inventor: Frede Hilmar Drostholm, 2950 Vedbaek, Denmark

[22] Filed: Nov. 24, 1972

[21] Appl. No.: 309,124

Related U.S. Application Data

[62] Division of Ser. No. 171,921, Aug. 16, 1971.

[30] Foreign Application Priority Data

Aug. 21, 1970  Denmark .......................... 4315/70

[52] U.S. Cl. ............... 264/209; 156/244; 156/500; 425/113
[51] Int. Cl.² .......................................... B29D 23/04
[58] Field of Search .......... 156/195, 244, 429, 431, 156/432, 446, 500, 537; 242/7.02, 7.21, 7.22; 264/145, 159, 209; 425/320, 457, 113

[56] References Cited
UNITED STATES PATENTS

| 3,130,104 | 4/1964 | Lewis et al. | 156/432 |
| 3,155,559 | 11/1964 | Hall | 156/429 |
| 3,271,064 | 9/1966 | Hall | 156/429 |
| 3,399,095 | 8/1968 | Hyland, Jr. | 156/244 |
| 3,464,879 | 9/1969 | Poulsen | 156/425 |
| 3,486,196 | 12/1969 | Klenk et al. | 156/244 |
| 3,533,883 | 10/1970 | Gartaganis et al. | 156/195 |
| 3,548,724 | 12/1970 | Hall | 156/195 |
| 3,616,072 | 10/1971 | Bostrom | 156/244 |
| 3,625,791 | 12/1971 | Lee et al. | 156/429 |
| 3,655,489 | 4/1972 | Poulsen | 156/429 |
| 3,679,521 | 7/1972 | Poulsen | 156/429 |
| 3,684,607 | 8/1972 | Morris et al. | 156/244 |
| 3,749,624 | 7/1973 | Lee et al. | 156/195 |
| R25,457 | 10/1963 | Lewis et al. | 156/429 |

Primary Examiner—Douglas J. Drummond
Assistant Examiner—Basil J. Lewris
Attorney, Agent, or Firm—Synnestvedt & Lechner

[57] ABSTRACT

Method and apparatus for making resin tubes or pipes, the apparatus comprising a supporting structure having a cylindrical surface and a carrier strip mounted thereon and fed in a plurality of adjacent helical turns to provide a moving cylindrical surface on which the resin articles are formed. Friction reducing means is associated with the interface between the cylindrical supporting surface and the inner surface of the helical turns of the carrier strip. Provision is also made for forming articles by extruding resin material onto the moving cylindrical surface provided by the helical turns of the carrier strip.

6 Claims, 8 Drawing Figures

METHOD AND APPARATUS FOR MAKING CONTINUOUS LENGTHS OF RESIN TUBES

This is a division of application Ser. No. 171,921, filed Aug. 16, 1971.

The invention embodies an equipment for extrusion and/or winding of resin tubes or pipes of infinite lengths. The equipment comprises a supporting structure such as a hollow core pipe open at the ends, around which an endless band carrying the plastic pipe can be fed. The band follows a helical path so that the coils of the band lie close together, and upon reaching the extreme end of the core pipe, the band feeds inside the hollow interior, and at the inner end is redirected to start the helical path again. The invention further embodies a process of extruding and/or winding the plastic pipe onto the equipment.

There is a known equipment of the general kind just mentioned, where radially protruding supporting devices are mounted on the outer surface of the core pipe, extending generally in a longitudinal direction, and which comprises a number of endless ball bands positioned parallel to the axis of the core pipe. Each ball band consists of an endless band in which holes are made, and a ball is placed in each hole. The balls are kept in place by means of guides placed around the band. The balls in the ball band support that part of an endless carrier band which follows a helical track. The outer surface of the carrier band serves as bearing surface for a plastic pipe which is formed on and which is delivered from the equipment, and ensures that the pipe is supported until it is sufficiently cured. When this equipment operates, the core pipe and the supporting devices will rotate, and at the same time the carrier band will be wound around the ball of the supporting devices. As these ball bands, as previously mentioned, are parallel to the longitudinal axis of the core pipe and are positioned at a certain distance from each other, the individual coils of the carrier band will tend to assume polygon shape, as there are limits as to how close to each other the longitudinal ball bands can be positioned around the core pipe. This polygon shape causes the inner face of the formed pipe to assume a corresponding polygon shape which is disadvantageous. This tendency is especially marked in the case of small diameters. Another disadvantage is that the design of the core pipe with accessories is rather complicated and therefore rather heavy.

It is a principal object of the invention to provide equipment of the above-mentioned type but which further makes it possible to manufacture extruded plastic pipes with perfectly smooth inner surfaces and of which the cross section is substantially circular (instead of polygonal), and which furthermore contains a very light and simple core pipe or supporting structure.

The equipment according to the invention is characterized in that the supporting structure or core pipe has a substantially cylindrical surface for supporting the carrier strip and in that the carrier band or strip which is mounted on the supporting structure or core pipe in a plurality of helical turns is pulled forward in its helical path with tractive force which is effective at one or several localized points of its path, primarily at one of the ends of the core pipe, and the equipment of the invention is further characterized by the provision of friction reducing means associated with the interface between the supporting structure and the inner surface of the helical turns of the carrier strip. Such friction reducing means may take several different forms, including means for introducing a film of a fluid medium between the supporting surface and the carrier strip, such as air or oil, or the friction reducing means may comprise friction reducing devices such as rollers or balls recessed in the outer surface of the core pipe, or both a fluid medium and rotating devices may be used.

By the use of any of these anti-friction devices, and especially by the use of a fluid medium, the carrier strip is supported throughout substantially its entire area and therefore will retain a substantially cylindrical shape, instead of a polygonal shape, as the helical turns are moved over the surface of the supporting structure.

In use of the equipment, tubular resin articles such as pipes may be formed in a variety of ways, for instance by the winding on the moving carrier strip fibrous reinforcements (e.g. glass fibers) impregnated with a heat hardenable liquid resin material, the tubular article thus formed being solidified, for instance by positioning a portion of the helical path of the carrier strip in an oven. Alternatively, various kinds of resin materials may be applied to the carrier surface provided by the helical turns of the carrier strip, for instance by extrusion of a thermoplastic resin, which may be effected by positioning a portion of the helical path of the carrier strip in an extruder nozzle or crosshead providing for extrusion of a cylindrical body of softened thermoplastic resin material on the moving surface. The apparatus is preferably of such length that provision is made for the hardening of the resin material while it is still supported upon the surface formed by the carrier strip. In the case of a thermoplastic resin this hardening may be accelerated by the use of cooling means.

In various uses of the equipment, the supporting structure for the carrier band may either be rotatively mounted or non-rotatively mounted as will further be explained hereinafter.

The continuous support of the carrier band has the consequence that plastic pipes manufactured--either by extrusion or by winding--on the outer surface of the carrier band will be perfectly smooth and curved inside. The outer surface of the core pipe is polished, and as mentioned it is not provided with any radially protruding supporting devices (as the already known core pipe). Therefore it is very light.

One embodiment of the equipment according to the invention is characterized in that the carrier band on the under side and close to one edge is provided with a supporting flange which projects beyond this edge and extends over the entire length of the carrier band so that each free band edge of one helical turn will overlap with and be supported by the supporting flange of the adjacent band turn. The supporting flange will furthermore help to guide the individual turns in relation to each other, and in case two band turns separate, so that a small gap is formed between them, the supporting flange will cover the gap. The supporting flange is particularly important if a friction reducing medium is inserted between the carrier band and the outer surface of the core pipe as the flange prevents the medium from forcing its way into the said gap. To this should be added that the supporting flange produces a very safe joint between the band turns, particularly when rovings are supplied to the soft plastic pipe being formed. The overlapped joint prevents the rovings from working their way under the band turns.

According to the invention the carrier band can be driven by electrically driven friction-loaded devices, as for instance one or several friction discs, which are mounted on the core pipe or supporting structure, preferably near the extreme outer end of the pipe. This will ensure safe advance of the carrying band on the outer surface of the core pipe.

In order to obtain a safe joint between carrier band and supporting flange, these parts may according to the invention be made of steel and be welded together.

Further, according to the invention, the carrier band with supporting flanges may be coated with a permanent release agent, as for instance polytetrafluoroethylene. This will further reduce the friction between the carrier band and the outer surface of the core pipe.

Further, according to the invention, on the free top side of the flange and/or on the adjacent free edge part of the carrier band on its under side, a coating of sealing compound may be provided, as for instance synthetic or natural rubber, which might possibly be inserted in a recess. This will provide a particularly good joint between adjacent band turns so that the friction reducing medium cannot or can only with difficulty escape between the turns.

Further, according to the invention, the friction reducing devices may consist of small revolving balls or small revolving rollers, diagonal or parallel to the axis of the core pipe, recessed in the curved outer surface of the core pipe. The rollers lie generally along a path which is identical to the helical path of the carrier band. This will further reduce the friction at the surface of the core pipe.

In one embodiment of the equipment, where the core pipe is mounted for rotation about its longitudinal axis, it is contemplated that the driving devices are arranged in such a way that they can turn the core pipe at a circumferential velocity which is equal to the velocity of and turning in the opposite direction as compared with the turns of the band, when the velocity is measured in the cross section of the core pipe, in view of which the turns are only moved axially along the outer surface of the core pipe. This version is particularly advantageous when it is required that the manufactured plastic pipe as it is being delivered from the equipment, be mounted or laid down in the ground and therefore must not rotate. This version is particularly appropriate in the manufacture of oil pipe lines.

According to the invention, the core pipe may be of a rugged cantilever construction resting on a central hollow axis which is open at its extreme outer end through which the carrier band can pass after having left the outer surface of the core pipe, and at which axis there may be a hole through which the carrier band is taken out so that it can reach some guides to engage and direct the band to the outer surface of the core pipe at its innermost end. The driving devices may comprise a motor provided with a gearing device coupled to the axis. This gives high reliability in the making and laying of for instance oil pipe lines as the drive devices can be very accurately regulated according to the speed at which the carrier band is pulled off from the extreme outer end of the core pipe and runs in through the hollow axis.

As mentioned, the invention also concerns a method of winding and/or extruding plastic or resin pipes of infinite lengths, the equipment having a core pipe around which an endless carrier band, which serves as carrier for the plastic pipe, can be fed in a helical path, and this method is characterized in that a friction reducing medium between the carrier band and the outer surface of the core pipe is supplied simultaneously with the pulling of the band across the curved outer surface of the core pipe, following a helical path, and lying in direct contact with this outer surface. In this way the friction on the outer surface of the core pipe is reduced very efficiently and in a very simple way.

According to the invention the supplied medium may be a very thin air cushion, but it is also possible according to the invention that the medium is an oil film which is maintained by an oil circulation. This gives easy control of the friction on the outer surface of the core pipe.

The invention is explained below under reference to the drawings where

Figure 7:
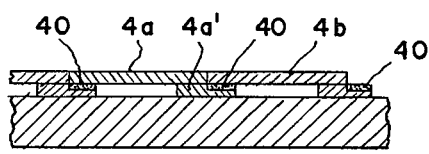
Figure 8:
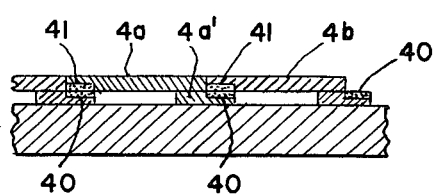

FIG. 7 shows one part of a longitudinal section of a core pipe according to the invention where the supporting flange of the carrier band is provided with sealing material; and FIG. 8 shows one part of a longitudinal section of a core pipe according to the invention, where the supporting flange of the carrier band as well as the free edge part of the band is provided with a coating of sealing material.

Figure 1:
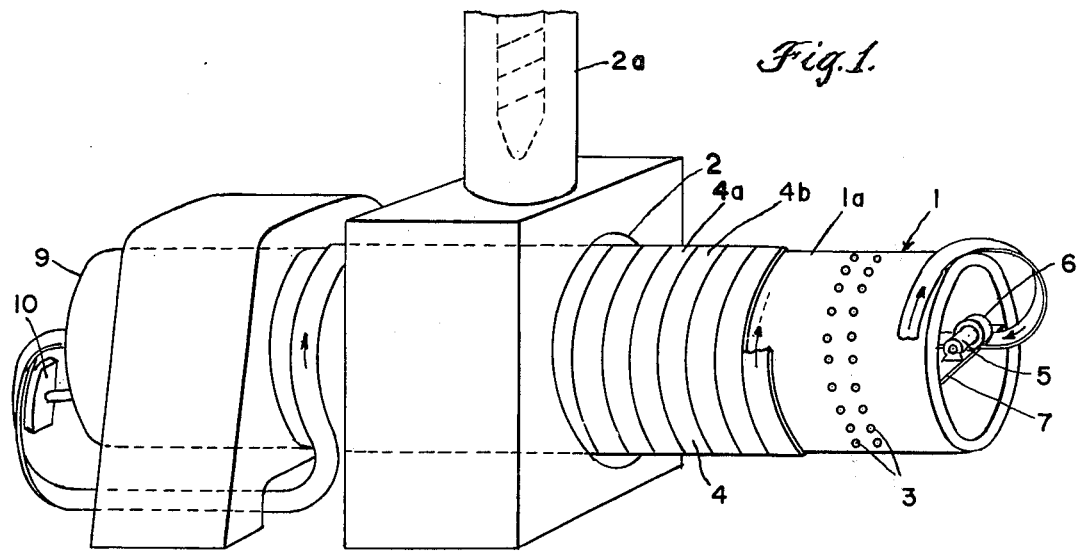
FIG. 1 is a schematic and perspective drawing of one version of the equipment according to the invention.

The apparatus in FIG. 1 consists of a non-rotative or fixed core pipe 1 which is mounted to extend through a passage in the crosshead or nozzle structure of an extruder such as the screw extruder diagrammatically indicated at 2a. The annular extrusion orifice 2 serves to deliver resin material, for instance a thermoplastic resin material, to the surface formed by the helical turns 4a and 4b of the endless carrier band or strip 4. Ports or passages 3 for supply of friction reducing medium as for instance compressed air or oil, distribute the medium over the surface a of the core pipe. The endless carrier band 4 slides directly on the surface 1a of the core pipe, and as shown its path is helical. The carrier band is pulled forward by an electric motor 5, the axis of which is provided with a friction disc 6. The electric motor is mounted on a plate 7, and the endless carrier band passes between the friction disc, and the plate 7 and is thus pulled forward. Having passed the friction wheel 6 at the extreme end of the core pipe, the band is fed into the hollow interior of the core pipe, and runs out of the core pipe at its innermost end 9, from which point it is redirected onto the outer surface 1a of the pipe. A springloaded rail 10 ensures that the band has the proper tension.

In order to make the figure easy to grasp, only certain parts of the band and band driving and guiding parts are here shown. Various of such parts are already known, for instance in U.S. Pat. No. 3,464,879 issued Sept. 2, 1969.

The arrows on the individual band support parts indicate their directions of motion. The surface 1a of the carrier band is polished in order to reduce the friction between band and surface. The friction-reducing medium emerging from the holes ensures a further reduction of the friction. If this medium is compressed air, an air cushion will form on the surface of the core pipe, and if oil is supplied, an oil film will form. It will be understood that whereas only two rows of holes 3 are shown, there are holes 3 all over the surface of the core pipe. It is also contemplated that it may sometimes be advantageous to have holes between those shown for the return of oil and air. When the equipment is working, the individual turns 4a, 4b lie close to each other thus building a supporting surface for the infinitely long plastic pipes which emerge from the extrusion nozzle 2. As the turns 4a, 4b rotate, the plastic pipe will also rotate during manufacture.

Figure 2:
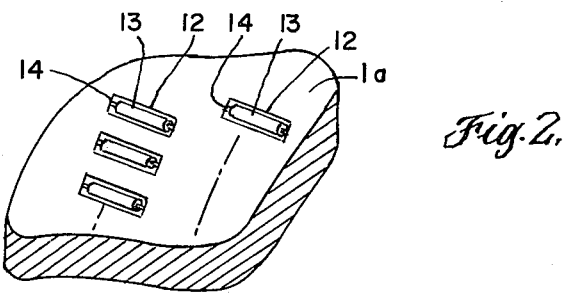
FIG. 2 shows one part of the surface of the core pipe where friction reducing devices in the shape of rollers are received in recesses.

Instead of supplying a friction reducing medium to the pipe surface 1a, it is possible (as shown in FIG. 2) to obtain a considerable friction reduction by positioning small rollers 13 in the recesses 12 in the surface. These rollers can rotate around an axis 14, as only the very topmost part of the rollers projects over the surface 1a. A band passing over the roller, will thus encounter very little friction on the spot where the roller is placed.

The rollers are placed in a series following a helical path with substantially the same pitch angle as the carrier band 4.

Figure 3:
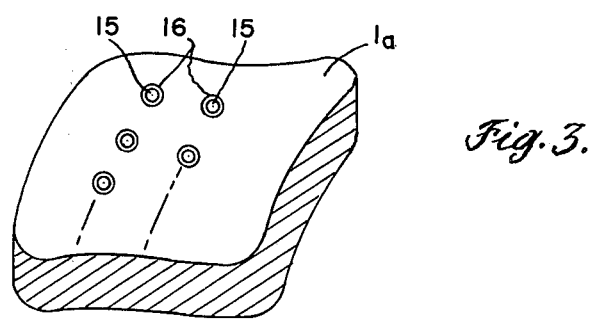
FIG. 3 shows one part of the surface of the core pipe where friction reducing devices in the shape of balls are mounted in the recesses.

As shown on FIG. 3 it is possible, instead of rollers 13, to position balls 15 in the round recesses 16. The balls are kept in place by means of not shown guides, and their position is chosen in such a way that only the very topmost parts of the balls project over the surface 1a.

Figure 4:
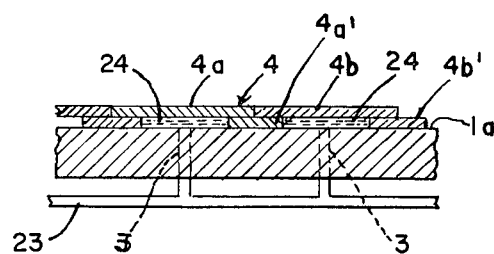
FIG. 4 shows one part of a longitudinal section of a core pipe according to the invention in which a fluid can be supplied to the surface and where the carrier band is provided with supporting flanges.

The carrier band 4 may on its under side near one edge be provided with a supporting flange (see FIG. 4). This flange at the band turn 4a is identified by the reference symbol 4a', while the flange at the turn 4b is identified by reference symbol 4b'. As will appear, the supporting flange 4a' supports the free edge of the adjacent turn 4b, and it further raises the band turns somewhat from the surface 1a. In FIG. 4 oil is supplied through the holes 3, and there is therefore oil in the cavities 24. The supporting flanges 4a', 4b' will cover a possible gap between the turns 4a, 4b and will thus prevent the oil in the cavities 24 from leaking out between the turns. The oil passing through the holes 3 is supplied by means of a pipe 23.

Figure 5:
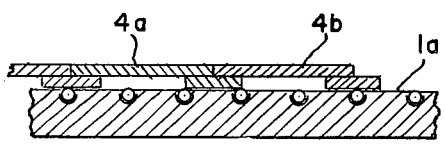
FIG. 5 shows one part of a longitudinal section of the core pipe, the surface being provided with inserted balls, and the carrier band being provided with supporting flanges.

In FIG. 5 a carrier band is seen which is built up in the same way as in FIG. 4 and which slides on a core pipe surface 1a provided with recessed balls. The band 4 may be coated with a release agent as for instance polytetrafluorethylene. Polytetrafluorethylene may also be used as a release agent on the top surface of the carrier strip.

Figure 6:
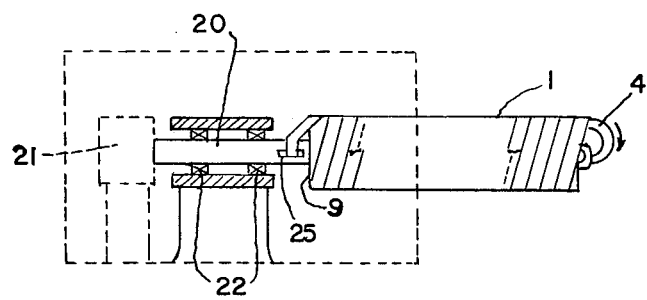
FIG. 6 is a schematic view of another version of the equipment according to the invention.

Instead of a core pipe of fixed cantilever construction, where the carrier band moves along a helical path, it is possible to have a revolving core pipe which rotates at a circumferential velocity which is equal to the velocity of the carrier band measured in a section or plane at right angles to the axis of the core pipe, but rotating in the opposite direction. In this way the carrier band, viewed from the outside, will advance slowly in the axial direction of the core pipe. This version of the equipment according to the invention has the advantage that the plastic pipe will not rotate while being produced. FIG. 6 illustrates an arrangement of this kind. The core pipe is of cantilever construction mounted on a hollow axis driven by a schematically shown electric motor 21 with adjustable speed. 22 are the bearings of the axis. Between the bearing support and the helical turns of the carrier band or strip, the axis 20 has a hole 25 through which the carrier band 4—which after having left the outer surface of the core pipe has been directed through the axis—can be taken out onto the outer surface of the core pipe again in the general manner already described above. The motor 21 drives the axis at such an angular velocity that the turns are then slowly advanced from the innermost part of the core pipe to the outermost, without any rotative motion.

In the embodiment of FIG. 6, the supply of plastic material to the outer surface of the band turns can take place either by extrusion through a ring nozzle (as in FIG. 1) or by winding on of plastic impregnated rovings. If the rotative motion of the supporting core for the carrier strip is such that the turns have only an axial motion, winding of such rovings will necessitate use of planetary winding equipment, which may be of known type. On the other hand in the arrangement of FIG. 6, the support or core pipe may be rotated at any selected speed, thereby providing for the winding of impregnated rovings without planetary equipment.

As mentioned the carrier band can be pulled forward by means of a friction disc at the extreme outer end of the core pipe, but if desired, the disc (which is driven by an electric motor) may be placed at the innermost end of the core pipe.

The invention can be modified in many ways without departing from the scope of the invention. The carrier band or bands are generally made of steel and the supporting flange which likewise is generally made of steel, may be fixed to the band by welding. A carrier band with a width between 40 and 88 mm. is preferred.

As shown in FIG. 7, it is further possible to provide the supporting flange 4a' of the carrier band with a recess on the upper surface and therein place a sealing material 40, and this material may consist of for instance synthetic or natural rubber. In the version shown in FIG. 8 there has been placed sealing materials 41 (in a recess) on the under side of the adjacent free edge part 4b of the carrier band. This will increase the sealing effect at those points where the band edges meet.

The invention is applicable to the manufacture of resin tubes or pipes formed either by winding or by extrusion or by combinations of extrusion and winding. Fibrous or other reinforcements may or may not be present, and various different layers may be applied so that the making of sandwich structures is feasible.

Many commonly available resins may be used in forming articles in accordance with this invention, including the well known thermoplastic resins and also a broad range of thermosetting resins used in making fiber reinforced articles. One example of a formulation suitable for extrusion is as follows (parts by weight):

| | |
|---|---|
| 100.0 | Polyester Resin |
| 0.1 | Cobalt Napthenate (6%) |
| 1.0 | M.E.K. Peroxide (60%) |
| 100.0 | Clay Filler |
| 10.0 | Chopped Glass Fiber (6 to 10 mm.) |
| 1 to 3 | Fumed Silica (viscosity controller to produce non sagging paste) |

This formulation can be extruded at low pressure and rapidly cured at low (room to 60°C.) temperatures.

While the invention has herein been shown and described in what is conceived to be a practical and effective embodiment, the invention is not to be limited to the details disclosed herein but is to be accorded the full scope of the claims so as to embrace any and all equivalents.

I claim:

1. A method for making tubes of resin material which method comprises continuously winding about a supporting structure an endless carrier strip in a plurality of nonrotative helical turns having their edges abutting each other to provide an uninterrupted cylindrical surface, advancing the wound turns axially thereof in a helical path by the use of power means, rotating the supporting structure by the use of independent power means at a speed equal to the component of the helical motion of the strip measured in a plane perpendicular to the axis of the supporting structure, but in a direction opposite to such component, thereby providing axial but nonrotative motion of said cylindrical surface, continuously extruding resin material in a soft condition in tubular form onto said axially moving cylindrical surface, and effecting solidification of the resin material while it is being carried on said surface.

2. Apparatus for making tubes of resin material, comprising a rotative supporting structure, a carrier strip wound around the supporting structure in a plurality of helical turns arranged with their edges adjacent and abutting each other to provide a cylindrical surface for carrying the resin material, power means for driving the helical turns of said carrier strip in a helical path with respect to the supporting structure, and independent power means for rotatively driving the supporting structure at a speed equal to the component of the helical motion of the strip measured in a plane perpendicular to the axis of the supporting structure, but in a direction opposite to such component, the combined action of said power means and said independent power means providing axial but nonrotative movement of said cylindrical surface.

3. Apparatus as defined in claim 2 further characterized by an extruder arranged to apply a layer of resin material onto the axially moving carrier surface.

4. Apparatus as defined in claim 3 further characterized in that one end of the axially moving surface provided by the turns of the carrier strip is positioned in the nozzle of the extruder to provide for extrusion of a tubular body of resin material directly onto the moving carrier surface.

5. Apparatus as defined in claim 2 in which the supporting structure for the helical turns of the carrier strip has a substantially cylindrical strip supporting surface.

6. Apparatus for making tubes of resin material, comprising a rotative supporting structure, a carrier strip wound around the supporting structure in a plurality of helical turns arranged with their edges adjacent and abutting each other to provide a cylindrical surface for carrying the resin material, motor means mounted for rotation with said supporting structure and engaging said strip to drive the helical turns of the strip in a helical path with respect to the supporting structure, and independent motor means for rotatively driving the supporting structure in a direction opposite to the rotational movement of the helical turns, said independent motor means being adjustable in speed.

* * * * *